Patented July 2, 1940

2,206,113

UNITED STATES PATENT OFFICE 2,206,113

PROTECTION OF AUTOXIDIZABLE MATERIALS

Ferdinand W. Nitardy, Brooklyn, N. Y., assignor to E. R. Squibb & Sons, New York, N. Y., a corporation of New York No Drawing. Application Ferbuary 21, 1936, Serial No. 65,071

2 Claims. (Cl. 167—81)

This invention relates to autoxidizable materials, particularly those used for therapeutic or alimentary purposes, and has for its object the provision of means and methods whereby such materials may be protected against the deteriorative effects of the atmosphere.

In the practice of this invention, autoxidizable therapeutic and alimentary materials are incorporated into or covered by a digestible edible fat —which term, as used herein, embraces not only fats proper but also higher alcohols—that is solid at room temperature, as by mixing them with the melted fat and allowing the mixture to cool, or absorbing them in nonfatty carriers and covering with the fat.

A preferred fat for the purpose is cacao butter, which, though hard and brittle at room temperature, melts at body temperature, is easily digested, and does not readily oxidize or rancidify. Many other suitable fats are available in the class of vegetable and animal stearins, palmitins, and hardened oleins, of which the following may be taken as representative: oleomargarine, coconut-oil high cake, hardened cacao butter or cottonseed or coconut oil, beef tallow, mutton tallow; as well as certain edible higher alcohols having melting points of at least 95° F. In consequence of the solid state of the mass, there is no diffusion or migration of particles from the interior to the surface; and since the envelope of fat prevents access of oxygen to the autoxidizable materials, an exceptional protective effect is assured.

Preferably the cacao butter or other fat should be substantially free from peroxide and acid; and the incorporation into the cacao butter or other fat of an antioxidant—say from 0.03% to 0.5% of hydroquinone—is frequently desirable, especially when the protected material contains vitamin A, which is extremely labile in the presence of oxygen. If the product is to be shipped or stocked at elevated temperatures, as in hot climates, the melting point of the cacao butter or other fat may be appropriately raised by well-known expedients.

Since the ingredients employed are ordinarily moisture-free, the product, unless water is introduced during the preparation thereof, will be substantially anhydrous, i. e., its moisture content will be less than 0.5%.

In addition to the therapeutic or alimentary materials (which may include brewers' yeast or wheat-germ extracts, for supplying vitamins B and G, as well as ingredients providing fat-soluble vitamins, minerals, and special food factors), other substances may be introduced: notably, agents for flavoring, for sweetening, for coloring, or for counteracting any undue tendency to liquefaction or fusion at temperatures ordinarily encountered (such as stearin, spermaceti, or refined beef tallow).

The mass comprising the therapeutic or alimentary and other materials incorporated in the fat may be formed into pellets, granules, wafers, tablets, or the like, which may each contain a unit dose or portion, to be chewed and/or swallowed. For still further protection, such wafers and tablets may be coated, by known methods, with, for example, sugar, chocolate, or melted cacao butter.

Conspicuous among the numerous materials to the protection of which the invention is adapted are vitaminic substances, including the highly potent liver oils of certain fish (inter alia halibut, swordfish, tuna, and salmon), concentrates thereof, and irradiated ergosterol and/or cholesterol. These are vitiated on exposure to oxygen, but the invention secures them against oxidative deterioration during the prolonged transportation and storage that, under the conditions of modern large-scale distribution, often intervene between manufacture and consumption.

*Example 1*

About 0.75 g. of irradiated ergosterol, or an equivalent amount of irradiated cholesterol, is dissolved directly in 2.5 kg. of melted hydrogenated cacao butter; or the irradiated sterol may be dissolved in corn oil or other suitable solvent and the solution is stirred into the melted cacao butter, the solvent, if volatile, being permitted to evaporate while the mixture cools. Pellets of about 0.5 g. each may be formed (as by extrusion) from the mass, or the mass may be granulated and filled into ordinary gelatin capsules.

*Example 2*

Since vitamin D functions to determine the normal deposition of calcium phosphate in the bones, it is advantageous to administer calcium and phosphorus simultaneously with irradiated ergosterol or other substances having a high vitamin-D content (such as tuna-liver oil). Accordingly, an edible therapeutic wafer may be composed as follows:

| | Percent |
|---|---|
| Cacao-butter solution of irradiated ergosterol | 6.29 |
| Dicalcium phosphate | 22.01 |
| Calcium gluconate | 14.67 |
| Methyl salicylate | 0.18 |
| Sugar | 54.72 |
| Talc | 2.13 |

The dicalcium phosphate and the calcium gluconate are separately granulated with the sugar, by the aid of water; the talc and methyl salicylate are mixed with the dried granulations, the mixture is evacuated (to eliminate occluded air), and: (a) the vacuum having been replaced by an inert atmosphere such as carbon dioxide, the mixture of granulations is intermingled with granules formed (by extrusion) from the cacao-butter solution of irradiated ergosterol, the mass chilled to a low temperature (to prevent fusion during the subsequent compression), and, while still maintained under anaeric conditions, compressed into wafers; or (b) the mixture of granulations, preferably while still under vacuum (to facilitate penetration by the solution), may have the cacao-butter solution poured over and well mixed with it, and the vacuum having been replaced by an inert atmosphere, the granules are cooled and compressed into wafers, which, unless they are definitely nonporous, are preferably given a protective coating.

Instead of the solution specified, there may be employed a solution of a highly potent fish-liver oil, of a fish-liver-oil concentrate, or of irradiated ergosterol or cholesterol, in a volatile solvent, such as ether; the mixture of granulations is impregnated with the solution under vacuum, the volatile solvent evaporated under vacuum, the vacuum replaced by an inert gas, cacao butter just above its melting point thoroughly intermingled with the mixture of granulations, the mass allowed to cool, further chilled, and (the granules being then coated with a layer of hard fat) compressed into wafers.

Another valuable composition may be prepared by mixing 6.29 parts of cacao-butter solution of irradiated ergosterol granules, 22.01 parts of dicalcium phosphate powder and 14.67 parts of calcium gluconate powder and filling into ordinary gelatin capsules.

Example 3

In the manner already described, wafers may be formed from calcium phosphate combined with from 5 to 10% of a solution of 18 g. of swordfish-liver-oil concentrate dissolved in 2.5 kg. of cacao butter containing 0.05% of hydroquinone; or with a solution of 50 g. of striped-Japanese-tuna-liver oil and 50 g. of spermaceti in 2.4 kg. of cacao butter; or with a solution of 180 g. alkali-refined, carbon-treated swordfish-liver oil and 180 g. refined beef tallow in 2.2 kg. of cacao butter, to which, while melted, 0.75 g. of irradiated ergosterol may be added if an increased vitamin-D content is desired.

Example 4

A mixture of

| | | |
|---|---|---|
| Fish-liver oil | grams | 0.70 |
| Hydroquinone | milligrams | 0.62 |
| Lecithin | grams | 0.75 |
| Hardened cottonseed oil | do | 2.0 |
| Cacao butter (dehydrated) | do | 15.0 | may be warmed to about 50° C. to produce a homogeneous liquid, which, on cooling, may be formed into pellets, to be consumed as such. All the ingredients being substantially anhydrous, so is the product.

Optionally, there may be added to the homogeneous liquid described in the preceding paragraph a solution, warmed to about 30° C., of 9.0 g. of acacia powder and 0.07 cc. of oil of spearmint in 30 cc. of water. With the resulting paste-like emulsion is combined a mixture consisting of

| | Grams |
|---|---|
| Malted-wheat-germ extract (containing vitamins B and G) | 30.3 |
| Skim-milk powder | 5.6 | and the mass is dried at a low temperature in vacuo; and the resulting dry, spongy emulsion, on being granulated and mixed with a previously prepared granulation of

| | Grams |
|---|---|
| Salt | 0.77 |
| Sugar powder | 51.7 |
| Cocoa powder | 13.6 | yields a product that is in the form of a sensibly dry granulation ready for compression.

It is to be understood that the foregoing examples are merely illustrative and by no means limitative of the invention, which may be variously otherwise embodied—as with respect to specific autoxidizable therapeutic or alimentary materials, digestible edible fats solid at room temperature, other ingredients, and procedures— within the scope of the appended claims.

I claim:

1. In making a compressed wafer or tablet from a mixture of granules of a non-fatty material and granules of a fat solid at room temperature, the step of chilling the mass to prevent fusion of the fat during compression.

2. A tablet or wafer formed from granules of a non-fatty material and granules of a fat solid at room temperature having dissolved therein a vitaminic substance of the group consisting of fish-liver oils, fish-liver-oil concentrates, and irradiated sterols.

FERDINAND W. NITARDY.